United States Patent [19]

Helldörfer et al.

[11] Patent Number: 5,375,452
[45] Date of Patent: Dec. 27, 1994

[54] METHOD FOR DETERMINATION OF WHEEL SPEED

[75] Inventors: Reinhard Helldörfer, Igelsdorf; Gerhard Hettich, Dietenhofen; Matthias Gramann, Neunkirchen; Jürgen Leuteritz, Nürnberg; Bernhard Töpfer, Stuttgart, all of Germany

[73] Assignees: Temic Telefunken microelectronic GmbH, Heilbronn; Mercedes-Benz AG, Stuttgart, both of Germany

[21] Appl. No.: 8,791

[22] Filed: Jan. 25, 1993

[30] Foreign Application Priority Data

Jan. 24, 1992 [DE] Germany ............... 4201867

[51] Int. Cl.$^5$ ............................... G01M 15/00
[52] U.S. Cl. ............................... 73/9; 73/129; 73/488
[58] Field of Search ............ 73/9, 121, 129, 118.1, 73/488, 509, 518, 519; 324/160

[56] References Cited

U.S. PATENT DOCUMENTS 5,109,694  5/1992  Yahagi et al. ............... 73/9

FOREIGN PATENT DOCUMENTS 3138834  4/1983  Germany.
3518340  11/1986 Germany.
3833211  4/1990  Germany.
3912555  10/1990 Germany.

Primary Examiner—Robert Raevis
Attorney, Agent, or Firm—Spencer, Frank & Schneider

[57] ABSTRACT

A method is described for determining the wheel speed during braking of a vehicle having in addition to at least one wheel with speed sensor at least one further wheel without speed sensor and means for determining the braking pressure. For this purpose, the braking operation is subdivided into several time intervals during which the relative value from the braking energy and the kinetic energy of the vehicle are obtained, and the contribution of the wheels without speed sensors to the braking energy is defined during a first time interval. Furthermore, the ratio of the relative value in this time interval to the relative values in further time intervals is formed, and the mean value for the wheel speed of all wheels without speed sensors is ascertained in the further time intervals from the ratio of the relative values.

24 Claims, 1 Drawing Sheet

METHOD FOR DETERMINATION OF WHEEL SPEED

DESCRIPTION OF THE PRIOR ART

For many braking processes in motor vehicles, knowledge of the wheel speed or of any differences in the speeds of individual wheels is of major importance: for example, in anti-lock systems (braking operation without the wheels locking), for differential slip control systems (optimum braking effect in all load states of the motor vehicle) or for determining the braking adhesion limit, the wheel speeds must be known for all axles of the vehicle, or at least information must be available on the mean values of the wheel speeds.

Usually, the wheel speed is measured using rotation angle sensors integrated in the wheel hub. This method of wheel speed measurement is however difficult and cost-intensive in vehicles with more than two axles—for example in trucks comprising tractor and trailer or in trucks with a tractor having a trailing axle or a driving axle—since the wheels of all axles have to be fitted with sensors; furthermore, additional plug/socket connections are needed, for example from the tractor to the trailer. If individual wheels of a vehicle are without speed sensors—for example in the case of conventional trailers without ABS in the case of trucks—it is not possible to obtain any information on the wheel speed, and hence dependable open-loop or closed-loop control of the braking process is not possible.

SUMMARY OF THE INVENTION

The object underlying the invention is to provide a method that permits the wheel speeds to be determined even when not all the wheels are provided with speed sensors. This object is attained in accordance with the invention by the provision of a method for determining wheel speed during a braking operation of a motor vehicle which has at least one wheel with a speed sensor, at least one further wheel without a speed sensor and means for determining breaking pressure, the method comprising the steps of: subdividing the braking operation into several time intervals ($t_1$, $t_2$, $t_i$) each having constant breaking pressure; forming, during each time interval, a relative value $W_{R1}$, $W_{R2}$, $W_{Ri}$ comprising a ratio of braking energy $W_B$ to kinetic energy $W_K$ of the vehicle, wherein the wheels without speed sensors have a defined contribution to breaking energy $W_B$ during a reference time interval $t_1$; obtaining a ratio of the relative value ($W_{R1}$) for the reference time interval to the further relative values ($W_{R2}$, $W_{Ri}$) for the further time intervals ($t_2$, $t_i$) respectively; and ascertaining a mean wheel speed (n) of all wheels without speed sensors in the further time intervals ($t_2$, $t_i$) from the ratio of the relative values. Advantageous embodiments of the method in accordance with the invention are described below.

When the speeds of the wheels with speed sensors and the pressures in the brake cylinders are known, it is possible with the method described, and with the aid of the work theorem—which states that the (wheel speed-dependent) braking energy expended during the braking operation is equal to the kinetic energy drawn from the vehicle during the braking operation—to determine the wheel speed at an additional wheel without a speed sensor or the mean value of the speeds of all wheels without speed sensors, without having to provide wheel speed sensors at these wheels. If the wheel speeds during the braking operation are known, it is possible to obtain more extensive information on the braking process—for example on the slip difference, the adhesion exploitation and on brake fading.

Determination of the wheel speed involves the following process steps:

The braking operation is divided up into several time intervals—each with constant braking pressure—and in each time interval the braking energy is referred to the respective kinetic energy by formation of the relative value.

If the braking pressure at all wheels with speed sensors and at least the mean value of the braking pressure for all wheels without speed sensors is known, the contribution of the wheels with speed sensors to the braking energy can be determined in each time interval of the braking operation. The contribution of the wheels without speed sensors to the braking energy can be determined up to a factor dependent on the wheel speed. Furthermore, the mass-dependent contributions of all wheels to the kinetic energy can be determined.

In one time interval of the braking operation—the reference time interval—the contribution of the wheels without speed sensors to the braking energy is defined This contribution is ascertained either as an approximate value by subjecting all wheels of the vehicle to the same low braking pressure in the reference time interval, so that in the first approximation the wheel speeds of all wheels match, or this contribution is rendered negligibly small by presetting the braking pressure o at the wheels without speed sensors in the reference time interval. During the reference time interval—which should preferably be at the start of the braking operation—the braking energy can thus be determined comprehensively.

The (mass-dependent) relative value from braking energy and kinetic energy in the first time interval is given as a ratio to the relative value in any second time interval of the braking operation, and the mass of the vehicle is thereby eliminated. The only remaining unknown and hence calculable quantity in the second time interval is now the wheel speed of the wheel or wheels without speed sensors.

If the braking operation is now subdivided into several time intervals, the mean wheel speed value of all wheels without speed sensors can be ascertained for each interval—for example the mean value of the wheel speed at a driving axle or trailing axle without speed sensors of a truck tractor, or the mean value of the wheel speeds in a trailer without speed sensors.

If the wheel speeds at all axles of a vehicle are successively calculated and evaluated in all time intervals of the braking operation, information on the braking operation (slip, slip difference, braking effect, adhesion . . . ) can be gained, and this operation subjected to open-loop or closed-loop control.

The method described combines a number of advantages:

the wheels without speed sensors or axles can be better integrated into the braking operation, hence rendering the braking process safer the braking force can be increased and the braking operation hence shortened locking tendencies can be detected even without ABS the adhesion limit can be detected well in advance no additional sensors are required, so that the method can be implemented inexpensively.

DESCRIPTION OF A PREFERRED EMBODIMENT

Figure 1:
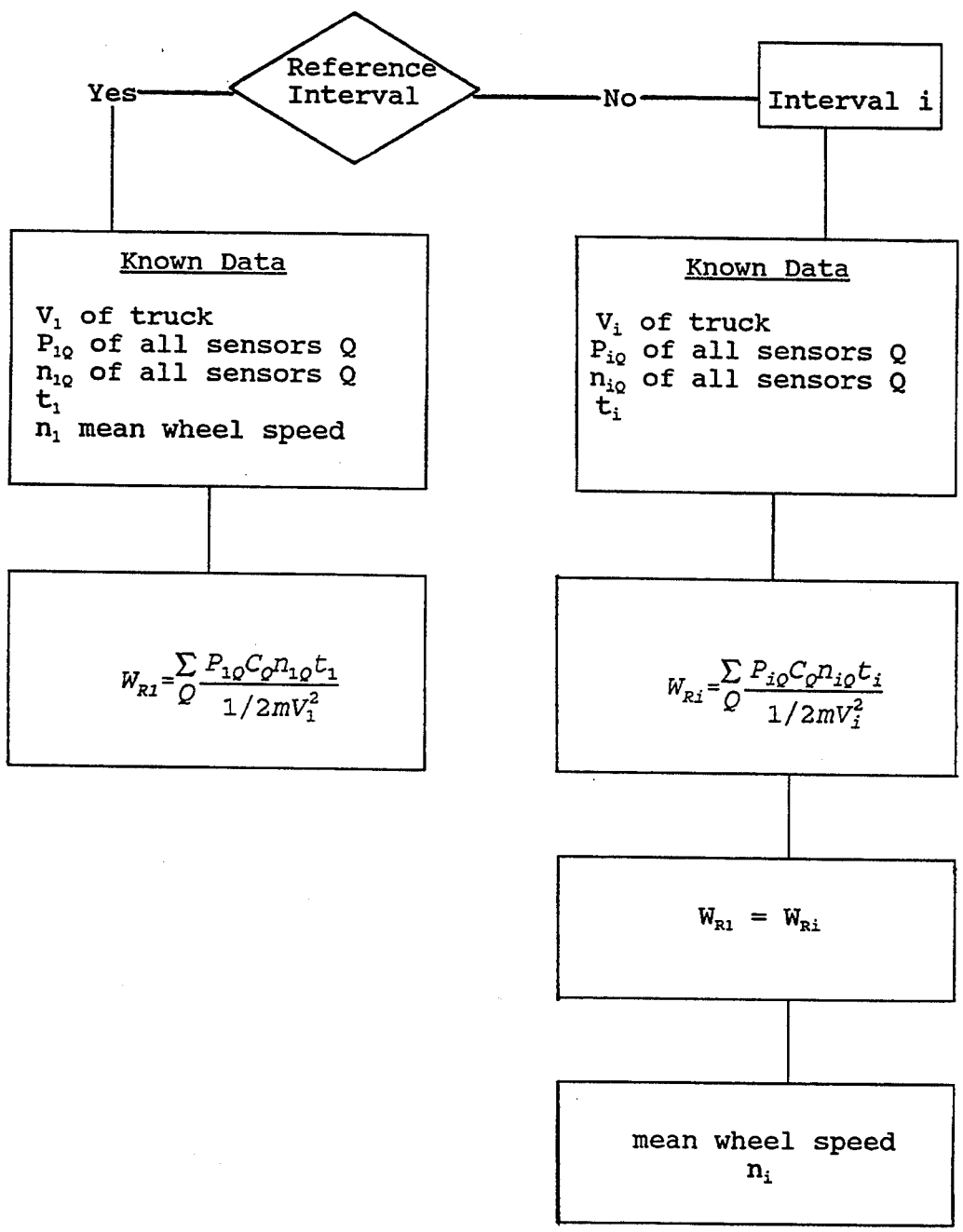
FIG. 1 is a flow diagram illustrating the fundamental steps of the method according to the invention.

The method for determining the wheel speed and a number of possible applications are set forth in the following on the basis of an embodiment—in a truck tractor with two main axles with speed sensors and one trailing axle without. The trailing axle (or lift axle) of a three-axled tractor vehicle generally has to bear a lower static or dynamic load than the associated axle (main axle); as a result, the trailing axle is very sensitive to possible overbraking. In order to control the trailing axle during the braking operation, the wheel speed information for this axle is ascertained successively during the braking process by determining the braking energy and the kinetic energy:

the braking energy $W_{BR}$ of an individual wheel depends on the braking force $F_B$ of the wheel acting on the tire/road contact point—the braking force $F_B$ is given by the product of the braking pressure p and the braking characteristic c, so that the associated braking energy $W_{BR}$ of a wheel can be expressed as follows:

$$W_{BR} = p \cdot c \cdot n \cdot t_i, \quad (1)$$

where n is the wheel speed and $t_i$ the length of the respective time interval i during the braking process. The entire braking energy $W_{Bi}$ expended by all wheels of a truck during the time interval i is given by the sum of the braking energy $W_{BR}$ of the individual wheels.

the kinetic energy $W_{Ki}$ during the time interval i depends on the mass m and the velocity v of the truck and is expressed as:

$$W_{Ki} = \tfrac{1}{2} m v^2 \quad (2)$$

With the formation of the relative value $W_{Ri} = W_{Bi}/W_{Ki}$ in a time interval i, the remaining unknown quantities are the wheel speed n of the two wheels without speed sensors on the trailing axle and the mass m of the vehicle; the velocity v of the truck, the length of the time intervals $t_i$, the braking characteristic c and the braking pressures p can be determined or sensed.

If the relative values $W_R = W_B/W_K$ of two time intervals $t_1$ (relative value $W_{R1}$) and $t_2$ (relative value $W_{R2}$) are expressed as a ratio to one another, the (unknown) mass m of the vehicle is eliminated, so that only the wheel speeds n of the two wheels without speed sensors of the trailing axle in the two time intervals $t_1$ and $t_2$ remain unknown quantities. In a time interval $t_1$ of the braking process—the "reference" time interval—the contribution of the two wheels without speed sensors to the braking energy $W_{B1}$ is defined: either the braking pressure p=o is applied to the two wheels without speed sensors—according to equation (1) the value $W_{BR}$=o results at these two wheels—or the same braking pressure p is applied to all wheels of the tractor vehicle, so that in the first approximation the speeds of all wheels (of the wheels with speed sensors together with the two wheels of the trailing axle) are matching. By successive formation of the ratio of the relative values $W_{R1}/W_{Ri}$ in all time intervals i of the braking process, a mean wheel speed value for the two wheels without speed sensors on the trailing axle during the braking process can be determined; the value thereby determined can be verified against other criteria (e.g. rise in wheel speed). The steps of the method of the invention as described above are illustrated in the flow diagram of FIG. 1.

Evaluation of the ascertained wheel speed values during the various time intervals of the braking operation supplies, for example, the following information on the braking process:

the slip at the trailing axle or the slip difference between the trailing axle and the main axles the braking pressure in the brake cylinders of the trailing axle and hence the braking force distribution between the main axles and the trailing axle can be regulated/controlled during the braking operation such that an optimum braking operation or braking effect is obtained the slip in the trailing axle can be determined as a function of the braking pressure; by evaluation of this function, it can be decided whether a "normal" braking operation is taking place, whether the adhesion limit between tire and roadway is reached (truck skidding), or whether the braking effect is fading.

The method for determining the wheel speed or a mean value of the wheel speeds can also be applied, for example, to the trailing axle of a three-axle truck tractor or for a trailer of a truck tractor in addition to the above example (trailing axle without speed sensors of a truck).

What is claimed is:

1. A method for determining the wheel speed during braking of a motor vehicle, said vehicle having in addition to at least one wheel with speed sensor at least one further wheel without speed sensor and means for determining the braking pressure, wherein the braking operation is subdivided into several time intervals ($t_1$, $t_2$, $t_i$) each having constant braking pressure, during which the relative values ($W_{R1}$, $W_{R2}$, $W_{Ri}$) respectively are formed from the braking energy ($W_B$) and the kinetic energy ($W_K$) of said vehicle, wherein during a time interval ($t_1$) serving as a reference time interval of said braking operation the contribution of the wheels without speed sensors to said braking energy ($W_B$) is defined, wherein the ratio of said relative value ($W_{R1}$) in said reference time interval ($t_1$) to said relative values ($W_{R2}$, $W_{Ri}$) is obtained in said further time intervals ($t_2$, $t_i$) respectively, and wherein the mean value for the wheel speed (n) of all wheels without speed sensors is ascertained in said further time intervals ($t_2$, $t_i$) from the ratio of said relative values.

2. A method according to claim 1, wherein the same braking pressure (p) is set at all wheels of said vehicle during said reference time interval ($t_1$), and wherein the value measured at the wheels with speed sensors is preset as the wheel speed (n) for all wheels without speed sensors in said reference time interval ($t_1$).

3. A method according to claim, wherein the timing of said wheel speeds (n) during said braking operation is determined by successive evaluation of the further time intervals ($t_2$, $t_i$).

4. A method according to claim 3, wherein the difference slip between various axles of a vehicle is determined by evaluation of said further time intervals ($t_2$, $t_i$).

5. A method according to claim 3, wherein the adhesion limit is determined by evaluation of said further time intervals ($t_2$, $t_i$).

6. A method according to claim 3, wherein brake fading is determined by evaluation of said further time intervals ($t_2$, $t_i$).

7. A method according to claim 1, wherein the value 0 is set for the braking pressure (p) at all wheels without speed sensors during said time interval ($t_1$).

8. A method according to claim 7, wherein the timing of said wheel speeds (n) during said braking operation is determined by successive evaluation of the further time intervals ($t_2$, $t_i$).

9. A method according to claim 8, wherein the difference slip between various axles of a vehicle is determined by evaluation of said further time intervals ($t_2$, $t_i$).

10. A method according to claim 8, wherein the adhesion limit is determined by evaluation of said further time intervals ($t_2$, $t_i$).

11. A method according to claim 8, wherein brake fading is determined by evaluation of said further time intervals ($t_2$, $t_i$).

12. A method according to claim 1 for determining the wheel speed at the driving axle without speed sensors of the truck tractor.

13. A method according to claim 1 for determining the wheel speed at the trailing axle without speed sensors of the truck tractor.

14. A method according to claim 1 for determining the wheel speed at the axles of the truck trailer.

15. A method for determining wheel speed during a braking operation of a motor vehicle which has at least one wheel with a speed sensor, at least one further wheel without a speed sensor and means for determining breaking pressure, said method comprising the steps of:

subdividing the braking operation into several time intervals ($t_1$, $t_2$, $t_i$) each having constant breaking pressure;

forming, during each time interval, a relative value ($W_{R1}$, $W_{R2}$, $W_{Ri}$) comprising a ratio of braking energy $W_B$ to kinetic energy $W_K$ of the vehicle, wherein the wheels without speed sensors have a defined contribution to breaking energy $W_B$ during a reference time interval $t_1$;

obtaining a ratio of the relative value ($W_{R1}$) for the reference time interval to the further relative values ($W_{R2}$, $W_{Ri}$) for the further time intervals ($t_2$, $t_i$), respectively; and ascertaining a mean wheel speed (n) of all wheels without speed sensors in the further time intervals ($t_2$, $t_i$) from the ratio of the relative values.

16. A method according to claim 15, wherein said forming step includes setting the same braking pressure (p) at all wheels of the vehicle during the reference time interval ($t_1$) and presetting the mean wheel speed (n) for all wheels without speed sensors in the reference time interval ($t_1$) to the value measured at the wheels with speed sensors.

17. A method according to claim 15, wherein said forming step includes setting the breaking pressure (p) at all wheels without speed sensors during the reference time interval to 0.

18. A method according to claim 15, wherein said obtaining and ascertaining step include successively forming the ratio of the relative values $W_{Ri}/W_{Ri}$ during the further time intervals ($t_1$, $t_i$) to determine the mean wheel speed during the breaking operation.

19. A method according to claim 15, including evaluating the ascertained mean wheel speeds of the wheels without speed sensors and the wheel speeds of the wheels with speed sensors during the various time intervals of the breaking operation to determine slip difference between various axles of the vehicle.

20. A method according to claim 15, including evaluating slip difference and breaking pressure during the various time intervals to ascertain an adhesion limit.

21. A method according to claim 20, including evaluating slip difference and breaking pressure during the various time intervals to ascertain an existence of break fading.

22. A method for determining wheel speed at a driving axle without speed sensors of a truck tractor utilizing the method according to claim 15.

23. A method for determining wheel speed at a trailing axle without speed sensors of a truck tractor utilizing the method according to claim 15.

24. A method for determining wheel speed at an axle of a truck trailer utilizing the method of claim 15.

* * * * *